(12) United States Patent
Thomas et al.

(10) Patent No.: US 8,631,014 B2
(45) Date of Patent: Jan. 14, 2014

(54) METHOD AND SYSTEM FOR INTEGRATED ASSET MANAGEMENT

(75) Inventors: Shawn Thomas, Austin, TX (US);
Gregory Gray, Austin, TX (US);
Michael Woodfin, Austin, TX (US);
Warner Mizell, Austin, TX (US); Brian Thomas, Austin, TX (US)

(73) Assignee: Caldvor Acquisitions Ltd., LLC, Dover, DE (US)

( * ) Notice: Subject to any disclaimer, the term of this patent is extended or adjusted under 35 U.S.C. 154(b) by 0 days.

(21) Appl. No.: 13/609,165

(22) Filed: Sep. 10, 2012

(65) Prior Publication Data

US 2013/0055236 A1 Feb. 28, 2013

Related U.S. Application Data

(62) Division of application No. 10/321,107, filed on Dec. 17, 2002, now Pat. No. 8,266,124.

(60) Provisional application No. 60/342,031, filed on Dec. 18, 2001.

(51) Int. Cl.
*G06F 17/00* (2006.01)

(52) U.S. Cl.
USPC ........... 707/744; 707/735; 707/743; 707/747; 707/711; 707/706

(58) Field of Classification Search
USPC .................. 707/706, 711, 747, 743, 744, 735
See application file for complete search history.

(56) References Cited

U.S. PATENT DOCUMENTS

| | | | |
|---|---|---|---|
| 4,558,413 A | 12/1985 | Schmidt et al. |
| 4,653,112 A | 3/1987 | Ouimette |
| 4,695,946 A | 9/1987 | Andreasen et al. |
| 4,714,995 A | 12/1987 | Materna et al. |
| 5,005,122 A | 4/1991 | Griffin et al. |
| 5,019,963 A | 5/1991 | Alderson et al. |
| 5,133,075 A | 7/1992 | Risch |
| 5,155,847 A | 10/1992 | Kirouac et al. |
| 5,249,290 A | 9/1993 | Heizer |

(Continued)

FOREIGN PATENT DOCUMENTS

| | | |
|---|---|---|
| CN | 1204410 | 1/1999 |
| EP | 0836140 | 4/1998 |

(Continued)

OTHER PUBLICATIONS

Lubanski, Mike, and Darshan Doshi. "SMS 2 Administration", 2000, New Riders Publishing, Chapter 1, 6 pages.

(Continued)

*Primary Examiner* — Sana Al Hashemi
(74) *Attorney, Agent, or Firm* — Perkins Coie LLP

(57) ABSTRACT

The method and system of the present invention provides an improved technique for integrated asset management. Information is aggregated from a variety of sources into a centralized computerized database. Thereafter, asset transition events are scheduled. Information from the centralized computerized database is used in the performance of the asset transition events and information relating to the asset transition events is added to the centralized computerized database. Subsequent changes to the asset are also recorded into the centralized computerized database. As a result, a plethora of information is available within said database for the purpose of managing future asset transition events.

12 Claims, 11 Drawing Sheets

(56) References Cited

U.S. PATENT DOCUMENTS

| | | | |
|---|---|---|---|
| 5,278,982 A | 1/1994 | Daniels et al. |
| 5,339,176 A | 8/1994 | Smilansky et al. |
| 5,355,498 A | 10/1994 | Provino |
| 5,414,843 A | 5/1995 | Nakamura et al. |
| 5,586,322 A | 12/1996 | Beck et al. |
| 5,673,382 A | 9/1997 | Cannon |
| 5,678,002 A | 10/1997 | Fawcett et al. |
| 5,752,244 A | 5/1998 | Rose et al. |
| 5,778,395 A | 7/1998 | Whiting et al. |
| 5,783,951 A | 7/1998 | Inoue et al. |
| 5,784,578 A | 7/1998 | Galloway |
| 5,787,234 A | 7/1998 | Molloy |
| 5,787,491 A | 7/1998 | Merkin et al. |
| 5,793,951 A | 8/1998 | Stein et al. |
| 5,799,147 A | 8/1998 | Shannon |
| 5,819,020 A | 10/1998 | Beeler |
| 5,852,811 A | 12/1998 | Atkins |
| 5,864,828 A | 1/1999 | Atkins |
| 5,881,285 A | 3/1999 | DeLeeuw |
| 5,884,285 A | 3/1999 | Atkins |
| 5,893,904 A | 4/1999 | Harris et al. |
| 5,893,906 A | 4/1999 | Daffin et al. |
| 5,909,669 A | 6/1999 | Havens |
| 5,911,135 A | 6/1999 | Atkins |
| 5,911,136 A | 6/1999 | Atkins |
| 5,920,700 A | 7/1999 | Gordon et al. |
| 5,923,850 A | 7/1999 | Barroux |
| 5,930,342 A | 7/1999 | Mazzapica |
| 5,959,275 A | 9/1999 | Hughes et al. |
| 5,974,536 A | 10/1999 | Richardson |
| 5,974,563 A | 10/1999 | Beeler, Jr. |
| 6,016,500 A | 1/2000 | Waldo et al. |
| 6,026,500 A | 2/2000 | Topff et al. |
| 6,038,551 A | 3/2000 | Barlow et al. |
| 6,038,665 A | 3/2000 | Bolt et al. |
| 6,049,784 A | 4/2000 | Weatherly et al. |
| 6,052,694 A | 4/2000 | Bromberg |
| 6,061,693 A | 5/2000 | Carney et al. |
| 6,108,641 A | 8/2000 | Kenna et al. |
| 6,110,229 A | 8/2000 | Yamaguchi |
| 6,118,447 A | 9/2000 | Harel |
| 6,127,661 A | 10/2000 | Fry |
| 6,128,661 A | 10/2000 | Flanagin et al. |
| 6,145,126 A | 11/2000 | Matsukura et al. |
| 6,161,176 A | 12/2000 | Hunter et al. |
| 6,181,336 B1 | 1/2001 | Chiu et al. |
| 6,182,212 B1 | 1/2001 | Atkins |
| 6,182,226 B1 | 1/2001 | Reid et al. |
| 6,185,576 B1 | 2/2001 | McIntosh |
| 6,189,008 B1 | 2/2001 | Easty et al. |
| 6,212,280 B1 | 4/2001 | Howard et al. |
| 6,220,768 B1 | 4/2001 | Barroux |
| 6,230,287 B1 | 5/2001 | Pinard et al. |
| 6,237,009 B1 | 5/2001 | Waldo et al. |
| 6,237,617 B1 | 5/2001 | Sturman et al. |
| 6,252,694 B1 | 6/2001 | Shinada |
| 6,256,773 B1 | 7/2001 | Bowman-Amuah |
| 6,266,774 B1 | 7/2001 | Sampath |
| 6,281,874 B1 | 8/2001 | Sivan et al. |
| 6,281,894 B1 | 8/2001 | Rive |
| 6,289,378 B1 | 9/2001 | Meyer et al. |
| 6,327,579 B1 | 12/2001 | Crawford |
| 6,327,617 B1 | 12/2001 | Fawcett et al. |
| 6,330,566 B1 | 12/2001 | Durham |
| 6,351,776 B1 | 2/2002 | O'Brien et al. |
| 6,363,498 B1 | 3/2002 | Howell |
| 6,363,499 B1 | 3/2002 | Delo |
| 6,366,916 B1 | 4/2002 | Baer |
| 6,370,646 B1 | 4/2002 | Goodman |
| 6,373,416 B1 | 4/2002 | McGrath et al. |
| 6,373,434 B1 | 4/2002 | Hayakawa |
| 6,374,263 B1 | 4/2002 | Bunger et al. |
| 6,381,597 B1 | 4/2002 | Lin |
| 6,381,644 B2 | 4/2002 | Munguia et al. |
| 6,385,621 B1 | 5/2002 | Frisina |
| 6,385,707 B1 | 5/2002 | Maffezzoni |
| 6,411,936 B1 | 6/2002 | Sanders |
| 6,438,749 B1 | 8/2002 | Chamberlain |
| 6,473,794 B1 | 10/2002 | Guheen et al. |
| 6,490,587 B2 | 12/2002 | Easty et al. |
| 6,499,049 B2 | 12/2002 | Waldo et al. |
| 6,502,096 B1 | 12/2002 | Siefert |
| 6,519,600 B1 | 2/2003 | Siefert |
| 6,532,543 B1 | 3/2003 | Smith |
| 6,539,369 B2 * | 3/2003 | Brown ......................... 707/744 |
| 6,553,375 B1 | 4/2003 | Huang et al. |
| 6,557,008 B1 | 4/2003 | Temple, III et al. |
| 6,571,276 B1 | 5/2003 | Burns et al. |
| 6,574,522 B1 | 6/2003 | Douglas |
| 6,574,617 B1 | 6/2003 | Immerman et al. |
| 6,609,090 B1 | 8/2003 | Hickman et al. |
| 6,615,253 B1 * | 9/2003 | Bowman-Amuah .......... 709/219 |
| 6,625,622 B1 | 9/2003 | Henrickson |
| 6,633,977 B1 | 10/2003 | Hamilton, II et al. |
| 6,636,857 B2 | 10/2003 | Thomas et al. |
| 6,640,244 B1 * | 10/2003 | Bowman-Amuah .......... 709/207 |
| 6,650,622 B1 | 11/2003 | Austerman |
| 6,651,050 B2 | 11/2003 | Shafrir et al. |
| 6,654,802 B1 | 11/2003 | Oliva |
| 6,662,357 B1 | 12/2003 | Bowman-Amuah |
| 6,691,064 B2 | 2/2004 | Vroman |
| 6,708,171 B1 | 3/2004 | Waldo et al. |
| 6,728,877 B2 | 4/2004 | Mackin et al. |
| 6,732,278 B2 | 5/2004 | Baird et al. |
| 6,754,696 B1 | 6/2004 | Kamath et al. |
| 6,782,394 B1 | 8/2004 | Landeck et al. |
| 6,829,734 B1 | 12/2004 | Kreulen et al. |
| 6,871,322 B2 | 3/2005 | Gusler et al. |
| 6,873,988 B2 | 3/2005 | Herrmann et al. |
| 6,882,961 B2 | 4/2005 | Cobble et al. |
| 6,901,416 B2 | 5/2005 | Tsai et al. |
| 7,080,372 B1 | 7/2006 | Cole |
| 7,110,353 B1 | 9/2006 | Deschaine et al. |
| 7,140,044 B2 | 11/2006 | Redlich et al. |
| 7,467,198 B2 | 12/2008 | Goodman et al. |
| 2001/0007128 A1 | 7/2001 | Lambert et al. |
| 2001/0012337 A1 | 8/2001 | Horie et al. |
| 2001/0026619 A1 | 10/2001 | Howard, Jr. et al. |
| 2001/0029474 A1 | 10/2001 | Yada |
| 2001/0037333 A1 | 11/2001 | Nishimura |
| 2001/0052013 A1 | 12/2001 | Munguia |
| 2002/0010808 A1 | 1/2002 | Wiggins |
| 2002/0010863 A1 | 1/2002 | Mankefors |
| 2002/0013807 A1 | 1/2002 | Richard |
| 2002/0038267 A1 | 3/2002 | Can et al. |
| 2002/0065736 A1 | 5/2002 | Willner et al. |
| 2002/0065825 A1 | 5/2002 | Kassan |
| 2002/0073114 A1 | 6/2002 | Nicastro et al. |
| 2002/0082966 A1 | 6/2002 | O'Brien et al. |
| 2002/0082997 A1 | 6/2002 | Kobata et al. |
| 2002/0083102 A1 | 6/2002 | Vetter |
| 2002/0091699 A1 | 7/2002 | Norton |
| 2002/0091975 A1 | 7/2002 | Redlich et al. |
| 2002/0099934 A1 | 7/2002 | Cromer |
| 2002/0103806 A1 | 8/2002 | Yamanoue |
| 2002/0104080 A1 | 8/2002 | Woodard |
| 2002/0123983 A1 | 9/2002 | Riley et al. |
| 2002/0143421 A1 | 10/2002 | Wetzer |
| 2002/0143598 A1 | 10/2002 | Scheer |
| 2002/0143775 A1 | 10/2002 | Wilkinson |
| 2002/0143782 A1 | 10/2002 | Headings et al. |
| 2002/0147601 A1 | 10/2002 | Fagan |
| 2002/0152151 A1 | 10/2002 | Baughman et al. |
| 2002/0152229 A1 | 10/2002 | Peng |
| 2002/0161600 A1 | 10/2002 | Stubiger et al. |
| 2002/0169714 A1 | 11/2002 | Ike et al. |
| 2002/0178364 A1 | 11/2002 | Weiss |
| 2002/0184619 A1 | 12/2002 | Meyerson |
| 2002/0184652 A1 | 12/2002 | Cezeaux |
| 2002/0194194 A1 | 12/2002 | Fenton et al. |
| 2002/0198997 A1 | 12/2002 | Linthicum |
| 2003/0004925 A1 | 1/2003 | Knoblock et al. |
| 2003/0009455 A1 | 1/2003 | Carlson |
| 2003/0009540 A1 | 1/2003 | Benfield et al. |

(56) References Cited

U.S. PATENT DOCUMENTS

| | | |
|---|---|---|
| 2003/0014508 A1 | 1/2003 | Cheston et al. |
| 2003/0018746 A1 | 1/2003 | Boesch |
| 2003/0046371 A1 | 3/2003 | Falkner |
| 2003/0055749 A1 | 3/2003 | Carmody et al. |
| 2003/0056140 A1 | 3/2003 | Taylor |
| 2003/0061159 A1 | 3/2003 | Adams et al. |
| 2003/0079132 A1 | 4/2003 | Bryant |
| 2003/0084067 A1 | 5/2003 | Obiaya |
| 2003/0084460 A1 | 5/2003 | Chung |
| 2003/0093521 A1 | 5/2003 | Schlonski |
| 2003/0093688 A1 | 5/2003 | Helgesen et al. |
| 2003/0110169 A1 | 6/2003 | Zuili |
| 2003/0120677 A1 | 6/2003 | Vernon |
| 2003/0120684 A1 | 6/2003 | Zuili |
| 2003/0126047 A1 | 7/2003 | Hollar |
| 2003/0126048 A1 | 7/2003 | Hollar |
| 2003/0130820 A1 | 7/2003 | Lane, III |
| 2003/0139985 A1 | 7/2003 | Hollar et al. |
| 2003/0140031 A1 | 7/2003 | Thomas et al. |
| 2003/0140046 A1 | 7/2003 | Thomas et al. |
| 2003/0140052 A1 | 7/2003 | Thomas et al. |
| 2003/0140057 A1 | 7/2003 | Thomas et al. |
| 2003/0140150 A1 | 7/2003 | Kemp |
| 2003/0154199 A1 | 8/2003 | Thomas |
| 2003/0167323 A1 | 9/2003 | Motoyama |
| 2003/0172020 A1 | 9/2003 | Davies et al. |
| 2003/0182211 A1 | 9/2003 | Sakurazawa et al. |
| 2003/0187758 A1 | 10/2003 | McKalko |
| 2003/0195764 A1 | 10/2003 | Baker et al. |
| 2003/0200274 A1 | 10/2003 | Henrickson |
| 2003/0200299 A1 | 10/2003 | Jamison, III |
| 2003/0200304 A1 | 10/2003 | Thorpe et al. |
| 2003/0216976 A1 | 11/2003 | Ehrman et al. |
| 2003/0217042 A1 | 11/2003 | Thomas |
| 2003/0217062 A1 | 11/2003 | Thomas |
| 2003/0225707 A1 | 12/2003 | Ehrman et al. |
| 2003/0225927 A1 | 12/2003 | Goodman |
| 2003/0233287 A1 | 12/2003 | Sadler et al. |
| 2003/0237022 A1 | 12/2003 | Thayer |
| 2004/0001088 A1 | 1/2004 | Stancil |
| 2004/0012808 A1 | 1/2004 | Payne et al. |
| 2004/0024657 A1 | 2/2004 | Wright et al. |
| 2004/0044688 A1 | 3/2004 | Brudz |
| 2004/0049578 A1 | 3/2004 | Ohara |
| 2004/0143428 A1 | 7/2004 | Rappaport et al. |
| 2005/0114468 A1 | 5/2005 | Philyaw |
| 2008/0177753 A1 | 7/2008 | Thomas et al. |
| 2010/0169981 A1 | 7/2010 | Thomas et al. |
| 2011/0047170 A1 | 2/2011 | Thomas et al. |
| 2012/0016962 A1 | 1/2012 | Thomas et al. |
| 2012/0179794 A1 | 7/2012 | Thomas et al. |

FOREIGN PATENT DOCUMENTS

| | | |
|---|---|---|
| EP | 0881567 | 12/1998 |
| EP | 1197886 | 4/2002 |
| EP | 1251656 | 10/2002 |
| EP | 1255196 | 11/2002 |
| GB | 2340273 | 2/2000 |
| JP | 03173273 | 6/2003 |
| WO | WO-9812656 | 3/1998 |
| WO | WO-9853396 | 11/1998 |
| WO | WO-0065438 | 11/2000 |
| WO | WO-0068816 | 11/2000 |
| WO | WO-0131482 | 5/2001 |
| WO | WO-0131494 | 5/2001 |
| WO | WO-01039030 | 5/2001 |
| WO | WO-0184274 | 11/2001 |
| WO | WO-01084278 | 11/2001 |
| WO | WO-0221274 | 3/2002 |
| WO | WO-0233631 | 4/2002 |
| WO | WO-02077764 | 10/2002 |
| WO | WO-02103548 | 12/2002 |
| WO | WO-03003163 | 1/2003 |
| WO | WO-03052600 | 1/2003 |
| WO | WO-03052560 | 2/2003 |
| WO | WO-03029922 | 4/2003 |
| WO | WO-03044718 | 5/2003 |
| WO | WO-03046681 | 6/2003 |
| WO | WO-03052228 | 6/2003 |
| WO | WO-03052557 | 6/2003 |
| WO | WO-03052558 | 6/2003 |
| WO | WO-03052559 | 6/2003 |
| WO | WO-03052601 | 6/2003 |
| WO | WO-03096179 | 11/2003 |
| WO | WO-04001589 | 12/2003 |

OTHER PUBLICATIONS

Microsoft Corporation. "The Windows Interface: An Application Design Guide", 1991, Microsoft Press, p. 4.

Codd, E. F. "A Relational Model of Data for Large Shared Data Banks", originally published in CACM, Jun. 1970, republished in "Readings in Database Systems", 3rd Edition edited by Michael Stonebraker and Joseph M. Hellerstein, 1998, pp. 5-15.

Blott, Stephen, Lukas Relly, and Hans-Jorg Schek. "An Open Abstract-Object Storage System". Institute for Information Systems, Jun. 1988, 16 pages.

Gaffney, John. "An Illustra Technical White Paper". Illustra Information Technologies, Inc., Oakland, CA, SIGMOD Record, vol. 25, No. 1, Mar. 1996, 8 pages.

Stroud, Emma. "Managing Your Assets". Internet World, May 1, 2001, 6 pages.

OPTO 22. "White Paper: Effectively Managing Real-World Assets From IT". Temecula, CA, 2000, 7 pages.

Unicenter IT Resource Management—CA Solutions. "Your Complete Life Cycle Management Solution for Managing On-Demand Computing", 2003, 11 pages.

"Foreign Office Action", Application Serial No. 02827159.9, (Apr. 24, 2009), 10 pages.

"PCT International Preliminary Examination Report", application No. PCT/US02/40820, (Sep. 11, 2004), 1 page.

Oppliger, R. "Security at the Internet Layer", Retrieved from <http://ieexplore.ieee.org>. Federal Office of Information Technology and Systems vol. 31, Issue 9, (Sep. 1998), pp. 43-47.

Aguilar, et al. "Business Process Simulation: A Fundamental Step Supporting Process Centered Management". In Proceedings of the 1999 Winter Simulation Conference. pp. 1383-1392.

"International Search Report", PCT/US02/40601, (Nov. 24, 2003), 2 pages.

"PCT International Preliminary Examination Report", PCT/US02/040601, (Apr. 26, 2004), 3 pages.

"Final Office Action", U.S. Appl. No. 10/321,037, (Dec. 27, 2007), 8 pages.

"Non-Final Office Action", U.S. Appl. No. 10/321,037, (Sep. 19, 2007), 5 pages.

"Non-Final Office Action", U.S. Appl. No. 10/321,037, (Jan. 5, 2007), 7 pages.

"Advisory Action", U.S. Appl. No. No. 10/321,037, (Sep. 8, 2006), 3 pages.

"Final Office Action", U.S. Appl. No. No. 10/321,037, (May 10, 2006), 7 pages.

"Non-Final Office Action", U.S. Appl. No. 10/321,037, (May 18, 2005), 6 pages.

"Final Office Action", U.S. Appl. No. 10/321,107, (Nov. 21, 2008), 10 pages.

"Non-final Office Action", U.S. Appl. No. 10/321,107, (Mar. 24, 2006), 7 pages.

"Advisory Action", U.S. Appl. No. 10/321,036, (Oct. 17, 2006), 3 pages.

"Final Office Action", U.S. Appl. No. 10/321,036, (Jul. 28, 2006), 12 pages.

"Non-Final Office Action", U.S. Appl. No. 10/321,036, (Feb. 10, 2006), 11 pages.

"Non-Final Office Action", U.S. Appl. No. 10/321,036, (Sep. 15, 2005), 10 pages.

"Final Office Action", U.S. Appl. No. 10/321,117, (Mar. 23, 2007).

(56) References Cited

OTHER PUBLICATIONS

"Non-Final Office Action", U.S. Appl. No. 10/321,117, (Oct. 2 2006), 9 pages.
"Final Office Action", U.S. Appl. No. 10/321,117, (Jan. 9, 2006), 8 pages.
"Non-Final Office Action", U.S. Appl. No. 10/321,117, (Aug. 2, 2005), 7 pages.
"Non-Final Office Action", U.S. Appl. No. 10/321,118, (Jul. 26, 2006), 8 pages.
"Foreign Notice of Rejection", Application Serial No. 02825256.X, (Feb. 13, 2009), 10 pages.
"Non-Final Office Action", U.S. Appl. No. 10/321,107, (Mar. 17, 2009), 11 pages.
"Final Office Action", U.S. Appl. No. 10/321,107, (Sep. 4, 2009), 11 pages.
"Non-Final Office Action", U.S. Appl. No. 12/056,969, (Aug. 25, 2009), 16 pages.
"Foreign Office Action", Chinese Application No. 02825544.5, (Oct. 9, 2009), 10 pages.
"Advisory Action", U.S. Appl. No. 10/321,107, (Dec. 1, 2009), 2 pages.
"Non-Final Office Action", U.S. Appl. No. 10/321,107, (Jan. 22, 2010), 10 pages.
"Foreign Office Action", Chinese Application No. 02827159.9, (Jan. 29, 2010), 14 pages.
"Foreign Office Action", Chinese Application No. 02825544.5, (Mar. 22, 2010), 11 pages.
"Non-Final Office Action", U.S. Appl. No. 12/056,969, (Feb. 22, 2010), 13 pages.
"Foreign Office Action", Chinese Application No. 02825256.X, (Jan. 24, 2007), 4 pages.
"Foreign Office Action", Chinese Application No. 02825256.X, (Jul. 11, 2008), 8 pages.
"Non-Final Office Action", U.S. Appl. No. 12/916,410, (Mar. 28, 2011), 21 pages.
"Examiner's Answer to Appeal Brief", U.S. Appl. No. 10/321,107, (Nov. 5, 2010), 10 pages.
"Final Office Action", U.S. Appl. No. 12/056,969, (Jun. 24, 2010), 17 pages.
"Final Office Action", U.S. Appl. No. 10/464,176, (Nov. 16, 2006), 29 pages.
"Final Office Action", U.S. Appl. No. 10/464,176, (Aug. 4, 2009), 8 pages.
"Non-Final Office Action", U.S. Appl. No. 10/464,176, (Jan. 22, 2009), 6 pages.
"Non-Final Office Action", U.S. Appl. No. 10/464,176, (Jan. 21, 2004), 31 pages.
"Non-Final Office Action", U.S. Appl. No. 10/464,176, (Mar. 23, 2006), 28 pages.
"Notice of Allowance", U.S. Appl. No. 10/464,176, (Nov. 30, 2009), 11 pages.
"PowerQuest Drive Image Version 2 User Guide". Power Quest Corporation, (1998), pp. 15-44.
"Restriction Requirement", U.S. Appl. No. 10/464,176, (Jul. 15, 2008), 8 pages.
"TransLINK." Retrieved from <http://web.archive.org/web/20010401115500/http://www.digital-assets.net/>. (Apr. 2001-Jan. 2002), 6 pages.
"PCT Initial Publication with International Search Report", PCT/US2002/040817 (Jun. 26, 2003), 14 pages.
"PCT International Search Report", PCT/US02/40820, (Sep. 18, 2003), 1 page.
"PCT International Search Resort", PCT/US02/40617, (Apr. 28, 2004), 1 page.
"PCT Written Opinion", PCT/US02/40617, (Sep. 22, 2006), 4 pages.
"PCT International Search Report", PCT/US2002/040816, (Jun. 24, 2003), 2 pages.
"PCT International Preliminary Examination Report", PCT/US2002/040816, (Jun. 18, 2004), 3 pages.
"PCT Initial Publication with International Search Report", PCT/US2002/040611, (Jun. 26, 2003), 13 pages.
"PCT International Preliminary Examination Report", PCT/US2002/040611, (Aug. 16, 2004), 3 pages.
"PCT International Preliminary Examination Report", PCT/US2002/040817, (Aug. 16, 2004), 3 pages.
"Non-Final Office Action", U.S. Appl. No. 12/723,327, (Dec. 27, 2010), 7 pages.
"Final Office Action", U.S. Appl. No. 12/723,327 (Jun. 9, 2011), 8 pages.
"Advisory Action", U.S. Appl. No. 12/723,327 (Aug. 17, 2011), 3 pages.
"Notice of Allowance", U.S. Appl. No. 12/916,410, (Oct. 12, 2011), 8 pages.
"Non-Final Office Action", U.S. Appl. No. 12/056,969, (Dec. 22, 2011), 22 pages.
"Decision on Appeal", U.S. Appl. No. 10/321,107 (Feb. 24, 2012), 6 pages.
"Notice of Allowance", U.S. Appl. No. 10/321,107, (May 2, 2012), 6 pages.
"Final Office Action", U.S. Appl. No. 12/056,969, (May 16, 2012), 14 pages.
"Advisory Action", U.S. Appl. No. 12/056,969 (Aug. 10, 2012), 3 pages.
"Examiner's Answer to Appeal Brief", U.S. Appl. No. 12/723,327, (Jun. 8, 2012), 14 pages.
"Notice of Allowance", U.S. Appl. No. 12/916,410, (Aug. 15, 2012), 7 pages.
"Non-Final Office Action", U.S. Appl. No. 13/417,064, (May 24, 2012), 10 pages.
United States Patent and Trademark Office, Non-Final Office Action, U.S. Appl. No. 13/243,983, mailed Oct. 1, 2012, 31 pages.
United States Patent and Trademark Office, Final Office Action, U.S. Appl. No. 13/417,064, mailed Nov. 8, 2012, 13 pages.
United States Patent and Trademark Office, Advisory Action, U.S. Appl. No. 13/417,064 mailed Jan. 24, 2013, 3 pages.
United States Patent and Trademark Office, Notice of Allowance, U.S. Appl. No. 13/417,064 mailed Mar. 5, 2013, 11 pages.
ASAP Software, "Intelligent Asset Management," retrieved from <www.asap.com>, (2003), 5 pages.

\* cited by examiner

User Information

FIG. 3

Legacy Asset Information

FIG. 4

New Asset Information

FIG. 5

Software Application Information

FIG. 6

Application Management Process

System Inventory Information

Data Dictionary

FIG. 9

User Software Information

FIG. 10

METHOD AND SYSTEM FOR INTEGRATED ASSET MANAGEMENT

PRIORITY STATEMENT UNDER 35 U.S.C. §119 & 37 C.F.R. §1.78

This application is a divisional application of U.S. patent application Ser. No. 10/321,107 filed Dec. 17, 2002 entitled "Integrated Asset Management."Which claims the benefit of U.S. Provisional Application Ser. No. 60/342,031 filed Dec. 18, 2001 in the names of Shawn Thomas, Gregory Gray, Michael Woodfin, Warner Mizell and Brian Thomas, entitled "Method and System for Deploying, Tracking and Managing Technology-Related Resources", all of which are hereby incorporated by reference in their entireties.

BACKGROUND OF THE INVENTION

1. Technical Field of the Invention

The present invention relates generally to a method and system for integrated asset management. More particularly, the present invention provides a means for aggregating information into a centralized computerized database and using that information to schedule and complete asset transition events. In addition, information from the asset transition event is added to the centralized computerized database to maintain an up to date aggregation of information regarding the asset. Thereafter, changes to the asset are monitored on an ongoing basis and information regarding changes thereto are incorporated into the centralized computerized database. As a result, information is available in the centralized computerized database by which future asset transition events can be managed.

2. Description of Related Art

Computer-related technology is advancing at a remarkable rate. New technologies are being introduced daily that add new functionality or features to pre-existing technology. As these new technologies are introduced, the prices of devices that incorporate those technologies drop. As prices drop, more and more users are upgrading systems and adding new devices. Consequently, sales of computer-related devices is currently at an all-time high.

This trend most heavily impacts corporations with large investments in computer-related assets. Often times, a large corporation is unable to manage its computer-related asset inventory. In most cases, there is no centralized system for monitoring and maintaining an up to date database containing all of the information necessary to make sound decisions. Companies typically have a mix of outdated equipment, relatively current equipment and state of the art equipment in their facilities. However, there is no good way to effectively track, monitor and report on all of the equipment at any one time.

In most cases, a physical inventory is taken to determine what assets the company has in inventory and the current status of those assets. Typically, a computer technician would access the existing asset and make either handwritten notes of the user's setting and preferences or input the information into a computer and save it to a diskette. This process is expensive and time consuming and yields a static result in which the data becomes stale as soon as the asset returns to service.

Effective asset management using existing methods is further limited because the information that is collected is not collected in such a manner that it is can be compiled, managed and updated in the future. Under existing methods, once the computer technician re-installs the information on a new machine, he destroys any records that he may have kept relating, for example, to the specific versions of software installed, the serial number of the computer on which it was installed or the date of installation and, if the information is saved, it is usually not accessible in an organized, easily-accessible manner. Consequently, when the new machine is ready to be upgraded, relocated or decommissioned, the computer technician must start anew to gather information about it and the user's settings and preferences.

There is a need, therefore, for an improved method and system for integrated asset management.

SUMMARY OF THE INVENTION

The present invention addresses the need for an improved method and system for integrated asset management. The present invention provides a method for asset management in which information concerning the asset and the user are aggregated from a variety of sources into a computerized centralized database. Thereafter, asset transition events are scheduled. Information from the centralized computerized database is used in the performance of the asset transition events and information relating to the asset transition events is added to the centralized computerized database. Subsequent changes to the asset are also recorded into the centralized computerized database. As a result, a plethora of information is available within said database for the purpose of managing future asset transition events.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 3 is a screen display showing user information aggregated during the method for integrated asset management;

FIG. 4 is a screen display showing current asset information aggregated during the method for integrated asset management;

FIG. 5 is a screen display showing new asset information aggregated during the method for integrated asset management;

FIG. 6 is a screen display showing software application information aggregated during the method for integrated asset management;

FIG. 9 is a screen display showing the application dictionary; and

FIG. 10 is a screen display showing user software information collected during the application management process.

DETAILED DESCRIPTION OF THE EXEMPLARY EMBODIMENTS OF THE INVENTION

The numerous innovative teachings of the present application will be described with particular reference to the presently preferred exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
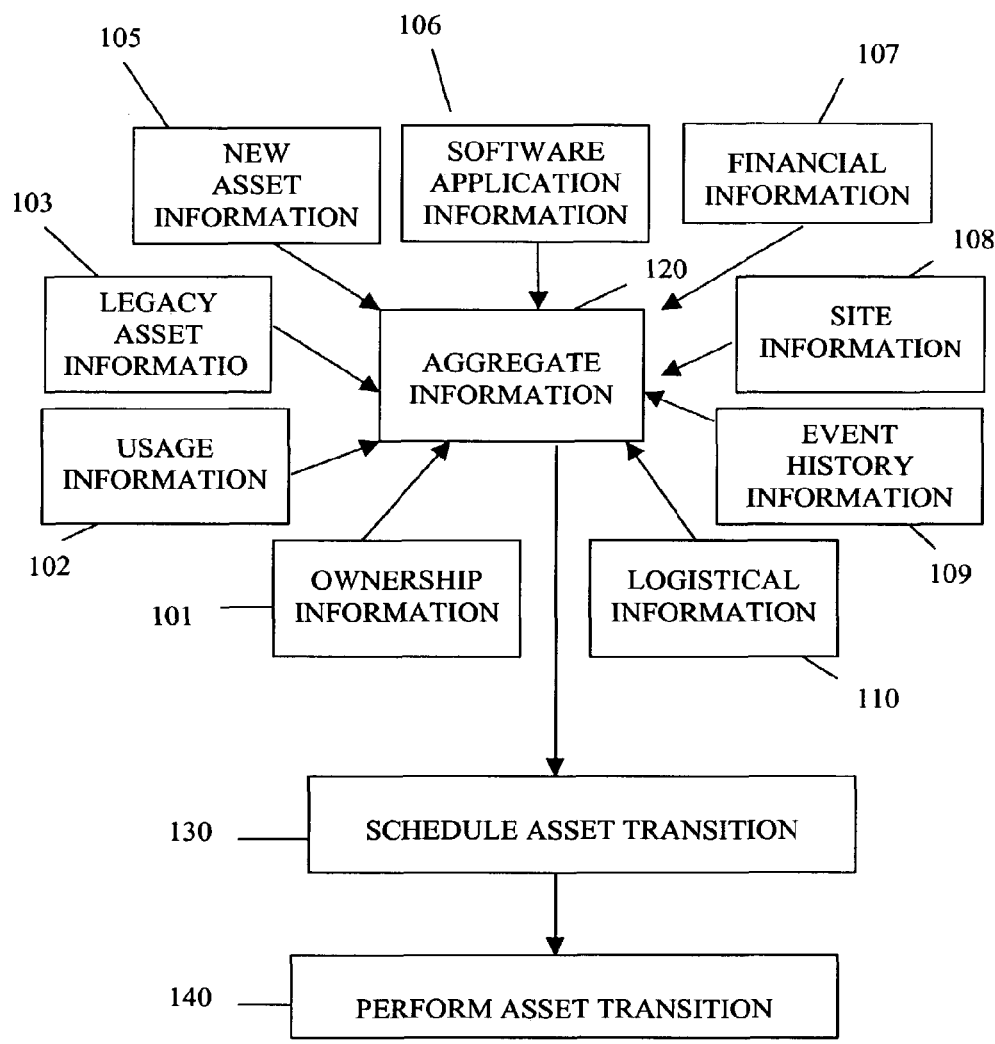
FIG. 1 is a flow diagram of a typical asset management workflow process.

FIG. 1 illustrates a typical asset management workflow. The initial step is to aggregate information 120. Information can be derived from a number of different sources. For example, information necessary in the asset transition may include ownership information 101, usage information 102, user information 103, legacy asset information 104, new asset information 105, software application information 106, financial information 107, site information 108, event history information 109, and logistical information 110. The initial assessment of available data sources dictates the process that will be used to acquire this information. In general, it is generally desirable to utilize existing data sources provided by the user. Because of the volume of information required, it is often difficult to obtain thorough information regarding the assets in question. In such cases, it is often necessary to proceed with an asset transition without all available information or to delay the asset transition until such time as the information is available.

Once information regarding the assets in question has been aggregated, a company will typically schedule an asset transition 130, such as an asset installation, asset relocation, asset disposition or asset maintenance activity. The scheduling activity is typically conducted on an ad hoc user by user basis, with little thought given to sequencing the asset transition services occurring between individual users and between individual assets. This results in a costly and inefficient asset transition.

The next step is to perform the asset transition 140. Even though great effort may have been expended in order to aggregate the information, little effort is typically made to retain, manage, or update that information for future use. Generally, records may be kept of the asset transition activities, but no effort is made to keep the information current on an ongoing basis.

Figure 2:
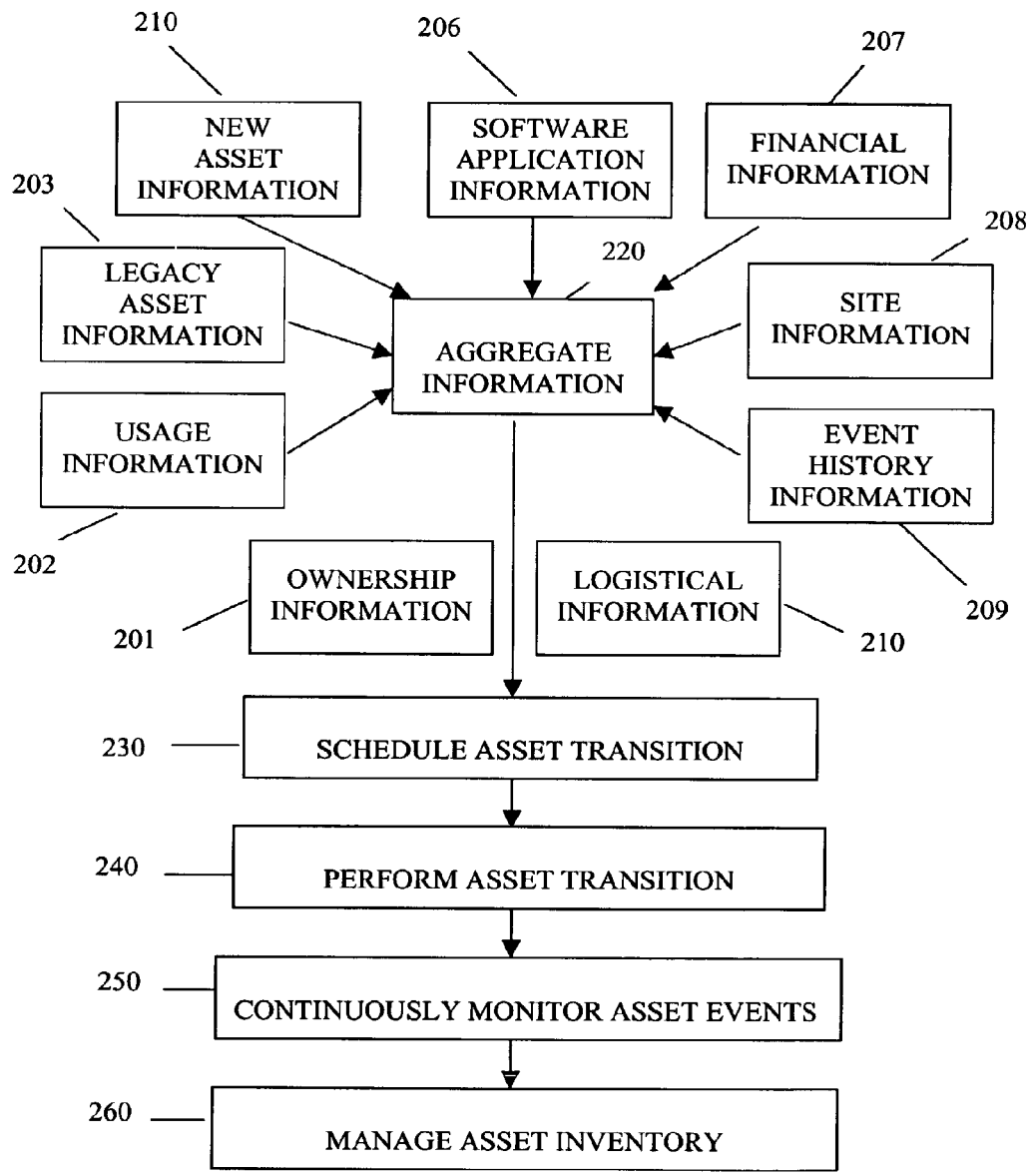
FIG. 2 is a workflow diagram showing the preferred method for asset management according to the present invention.

The preferred method for integrated asset management according to the present invention is shown in FIG. 2. As in the prior art, the first step is to aggregate information 220. Once again, the type of information aggregated includes ownership information 201, usage information 202, user information 203, legacy asset information 204, new asset information 205, software application information 206, financial information 207, site information 208, event history information 209, and logistical information 210. Once aggregated, the information is stored, for example, in a relational database.

Under this preferred embodiment, it is critical to obtain accurate information in each of the foregoing instances. When accurate, up-to-date information is available, that information may be included within the information that is aggregated. If accurate and up-to-date information is not available, it is necessary to match multiple data sources and utilize discovery technology to build an accurate information repository. Although additional time is required to gather information anew, it is critical to have accurate and complete information in the repository. This information can be acquired in a number of ways. For example, the typical sources for user information are either the human resource system or e-mail. Typical sources for legacy asset information include fixed asset schedules and legacy asset management systems. Software application information may be found through an electronic discovery process and site information can be derived from the human resource system, fixed asset system, facilities information, IP address schemes, or internal address books.

It is instructive to examine the type of information aggregated as part of the preferred embodiment. For example, user information 203 provides details about each end user who will be involved from a service delivery standpoint. Such information includes the user's name, contact phone numbers, mail addresses, e-mail addresses and organizational information, such as manager, department and cost center. User information 203 may also include information regarding the user's role in the organization, if they have the IP status and if they are a remote user.

Legacy asset information 204 includes such information as configuration, serial numbers, manufacturer, make, model, internal components, and attached devices. This information is typically gathered through use of an electronic discovery technology. Other legacy asset information 204 includes details about the physical location of an asset within a building, cube number, office number, jack number and IP address.

New asset information 205 is the information used for procurement or order placement. The details for each new asset are derived from an integrated configuration catalogue. The catalogue contains the basic system information as well as details about specific configuration options for each new asset. This information is then sent to the manufacturers to acquire the appropriate new assets for the technology implementation. New asset information may include such information as scheduled install date, new workstation type, workstation description, workstation costs, and attached devices. For application information 206 identifies which software applications are being used by, or are resident on, a given asset. For application information 206 can be obtained by scanning the shortcuts or an in-depth scan of all executable files on the computer. The results of the scan are then filtered against an application dictionary. The application dictionary contains a profile of each application in it, its current status, ownership and readiness for deployment. The application filtering process yields a definitive list of the applications that need to be installed on the new device. A detailed description of the preferred embodiment for collection of software application information is described later.

Site information 208 includes information about each individual site where a service will be performed. Site information 208 includes basic information, such as address and type of site, as well as detailed information about the logistics of the site, such as network infrastructure, special considerations regarding accessing the site, and contact resources.

The foregoing examples are intended to illustrate the types of information to be collected as part of the initial step of aggregating information 220. The information is stored on a storage medium distinct from the asset in question. Information may be stored on the remote storage medium in a centralized computerized database. Information may be transmitted to this centralized computerized database, for example, through the Internet or through a local area network. Also, it may be desirable to transmit such information by means of a secure, encrypted transmission. Alternatively, it may be desirable to change the file into formatted data files prior to transmission or to incorporate a means for removing unwanted or redundant information prior to transmission.

After all information has been aggregated, the next step is to schedule the asset transition 230. Assets involved in the asset transition may be, for example, desktop computers, laptop computers, handheld computers, printers, scanners, networking devices and storage devices. In the preferred embodiment, users are grouped together by site and proximity that will be the makeup of a scheduled implementation. Scheduling is facilitated through a series of automated processes that reconcile the activities of software, labor and equipment components necessary for the asset transition. As the transition activities are scheduled, a series of readiness checks are performed to ensure that the new assets and applications are ready for deployment. If certain assets or applications are not ready, the schedule is instantaneously modified in order to minimize activity disruptions during the asset transition process.

The next step is to perform the asset transition 240. Depending upon the specific transition to be performed, a tailored web page or series of web pages to guide the technician through the process. The use of automated functions simplifies and streamlines the transition process. Examples of the types of automated processes used to perform asset transition 240 include a central repository of the aggregated information, an auto discovery agent that detects all relevant aspects of a networked device and its resident applications, an automated application to backup and restore user data from an old device to a new device, an automated application to backup and restore personality settings from an old device to a new device, an automated application to detect an asset's serial number, an application dictionary as previously described, and an automated application that invokes the downloading of a user's application from a remote database. These integrated technologies are inherent in the preferred embodiment and are critical to support an efficient workflow process, maintain an up-to-date central repository, reduce technician time, reduce technician error, capture and track the results of a technician's work as he performs tasks and make accurate information available to interested parties.

The specific process performed by the technician as he performs asset transition 240 may have multiple steps. Use of the web page system allows the ability to capture information about each step such as time, number of units installed and increments. This information is used for ongoing asset management. For example, the information captured during the process notify the actual minutes required to perform a task, the actual number of data files and sizes backed up and restored, and the duration of time involved.

The next step is to engage in continuously monitoring asset events 250. This step is critical to maintain a vibrant and robust repository of information. As new asset transition events occur, information from those events must be added to the information repository in order to keep the most current information available to interested parties.

The final step in the process is the management of asset inventory 260. As the information repository contains accurate, up-to-date information regarding the assets, those assets can be managed in on a real-time basis. Assets may be managed at a very high level, for example, in an executive summary, down to a detailed task level. Information available to assist in asset management may include, for example, status by location, status by group, hardware mix by site, user detailed software reports, warehouse status by group, technical status, asset reconciliation, asset disposition and user survey satisfaction. Management may include project management, installation management, relocation management, lease management, exception management, scheduling management, workflow management and resource management. In addition reports may be generated based on the aforementioned management activities, including such reports as project reports, asset reports, lease reports, activity reports, exception reports and consumer satisfaction reports. As part of the overall management function, a means may also be provided for monitoring, updating and controlling versions of the software installed on different devices or a means for translating information in the centralized computerized database into a common language.

Figure 3:
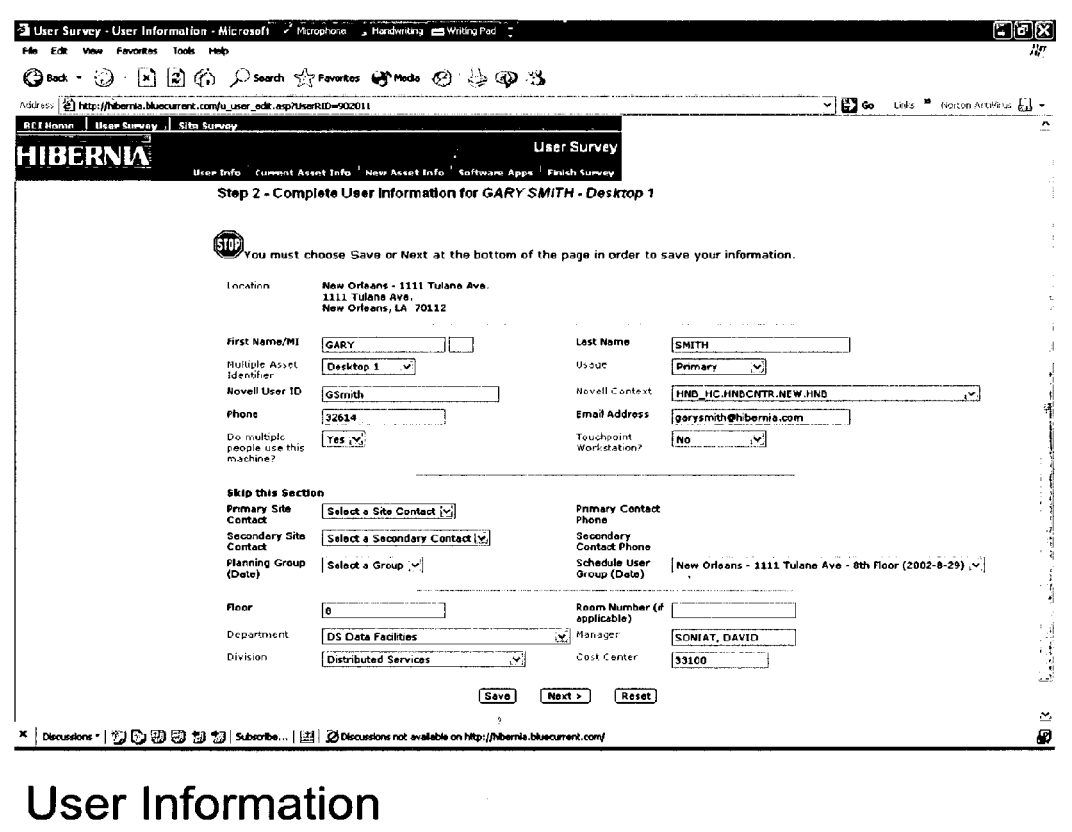

FIG. 3 illustrates a screen display in which the technician is prompted to impute user information. User information will provide detail about each end user who will be involved in the process. User information includes new names, contact phone numbers, e-mail addresses and organizational information, such as the manager's name, user's department and cost center. Other user information may include the user's role in the organization, whether or not the user has VIP status and whether or not they use the system remotely.

Figure 4:
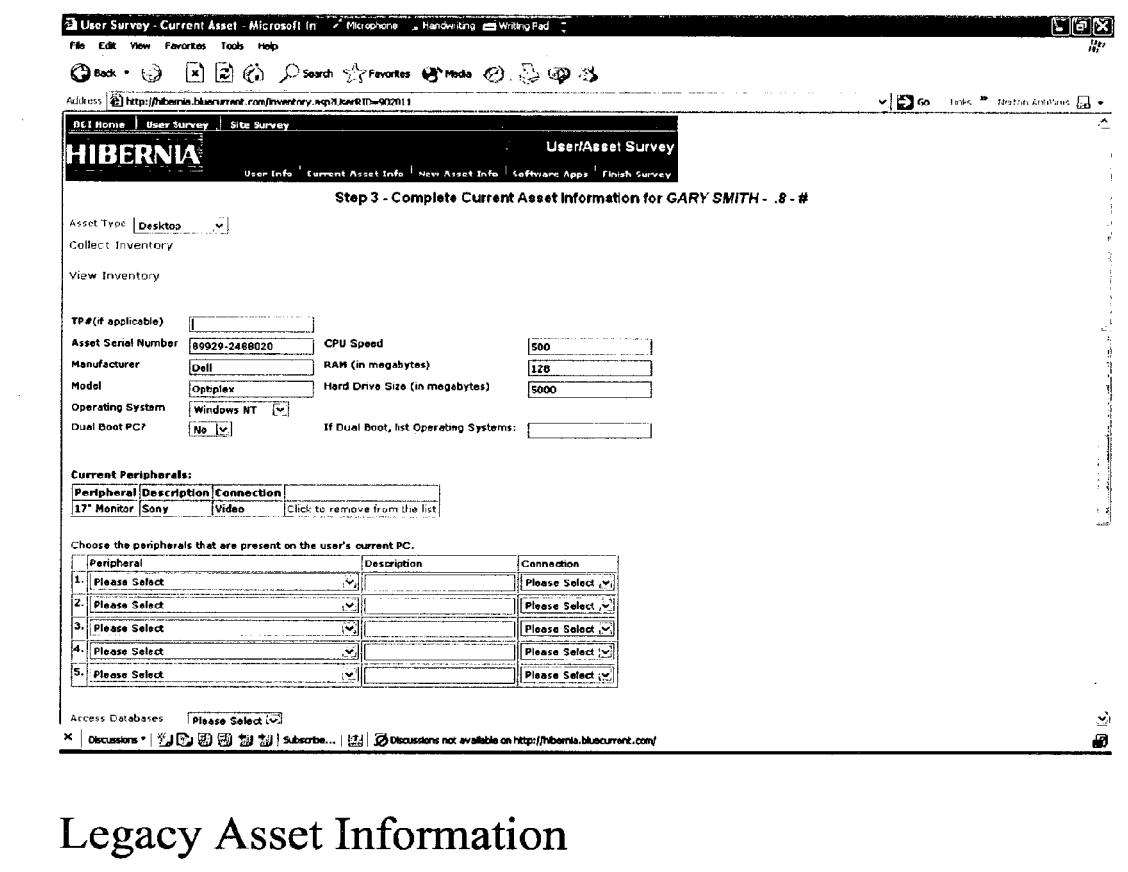

FIG. 4 illustrates a screen display which the technician may use to impute Legacy Asset information. This may include such information as the configuration, serial numbers, manufacturer, make, model, internal components and attached devices. Other Legacy Asset information may include details regarding the physical location of the asset within a building, office number, cube number, jack number and IP address.

Figure 5:
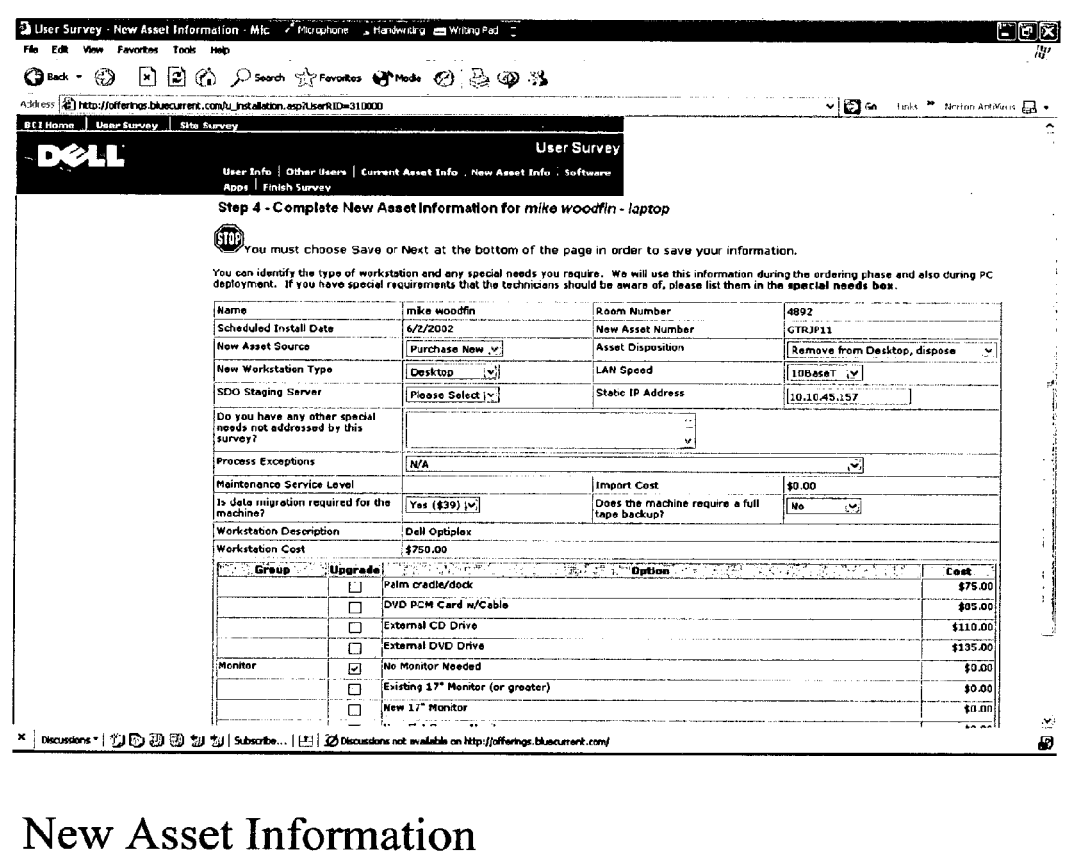

FIG. 5 illustrates screen display which a technician may use to impute new asset information. Such information is primarily used for the procurement of the new asset. Details for each new asset are generally derived from integrated configuration catalog. Such catalog contains basic information, as well as specific details, regarding specific configuration options for each asset. Such information is then forwarded to the selected manufacturer acquisition.

Figure 6:
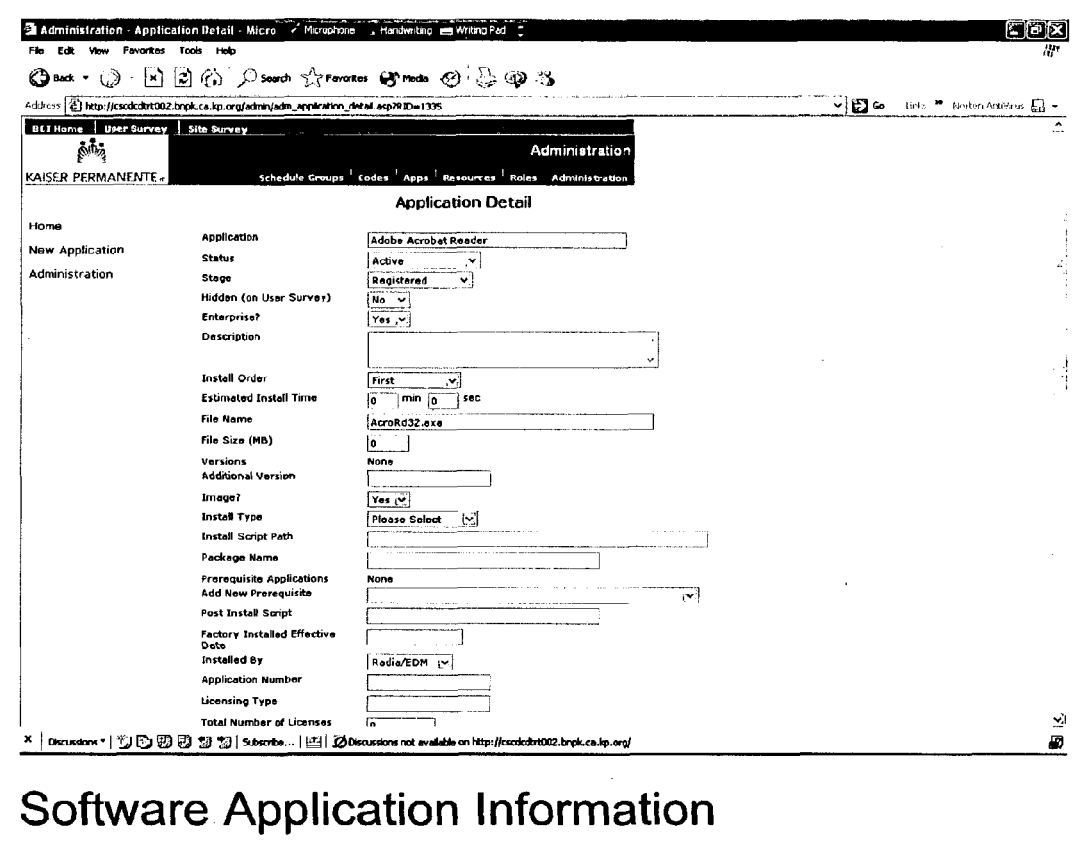

FIG. 6 illustrates a screen display which a technician may use to impute software application information. Such information may include the name of the application, the status of the application, whether the application has been registered or not, whether the license for the application is an enterprise license, the order in which the application should be installed, and the version of the application.

Figure 7:
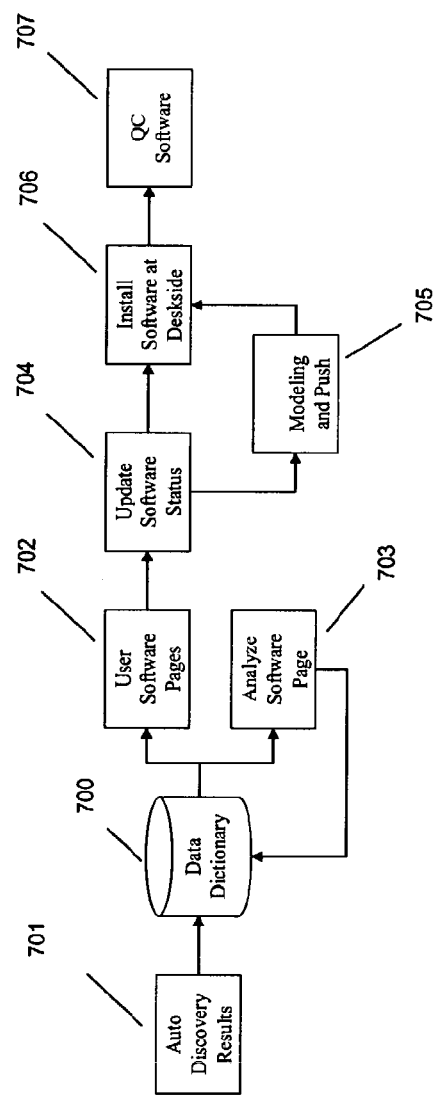
FIG. 7 is a workflow diagram showing the application management process.

FIG. 7 illustrates a work flow diagram showing the application management process. Initially, an electronic auto discovery tool identifies applications on the desktop. The equipment is scanned to identify the application used, information such as the names of executable files, manufacturer, version and path are captured, and the auto discovery results 701 are sent to the data dictionary 700 in the form of an XML package. The auto discovery results 701 are then processed against the data dictionary 700. The data dictionary 700 was created from electronic auto discovery processes with previous updates of non-discovered information. The data dictionary 700 therefor contains details about all available applications. Such as, for example, the status, the media on which it was installed, and authorized installers. The auto discovery results 701 are processed against the data dictionary 700 in order to control the discovery process, rationalize the results, control the installation process and control the quality of the installation.

A user software page 702 is then created based on the information in the data dictionary 700. During the creation of the user software page 702, the system will analyze the software page 703 against the information contained in the data dictionary 700. During this analysis, an assessment will be made of whether the applications discovered or selected are contained within the data dictionary and whether the applications are available in the image. The analysis will determine the difference between the applications on the user's software page 702 and those in the data dictionary 700. A report can then be generated of the differences. In addition, a mechanism can be incorporated to define an import missing applications into the dictionary. Once the user's software pages 702 have been established, the next step is to update the software status 704. Each software application can be classified as just for example "discovered" in which it doesn't appear in the technician's installation or quality control pages, "install" in which it appears on technicians and quality control pages, "do not install" in which it doesn't appear in technician or quality control pages or "install later" in which it doesn't appear in technician or quality control pages. In addition, non-packaged applications can be identified and installed or marked for later installation. Once the software status has been updated, 704, those software applications designated for installation will be installed 706. Thereafter, there will be a quality control function performed on the software 707. During this step, the applications are quality controlled against the intended list.

Figure 8:
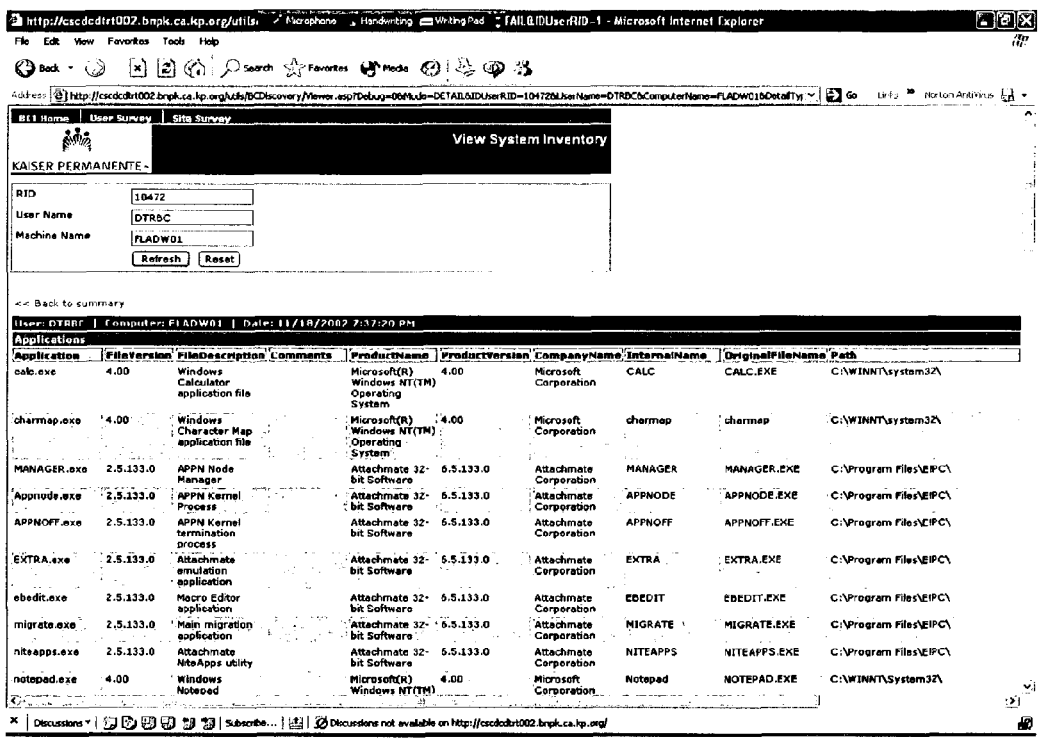
FIG. 8 is a screen display showing system inventory information collected during the application management process.

FIG. 8 illustrates a screen display showing system inventory information which may be generated from the Auto Discovery results. System inventory information contains such information as the names of executable files, the manufacturer of the product, the internal name of the product and the path. This information is subsequently forwarded to the data dictionary.

Figure 9:
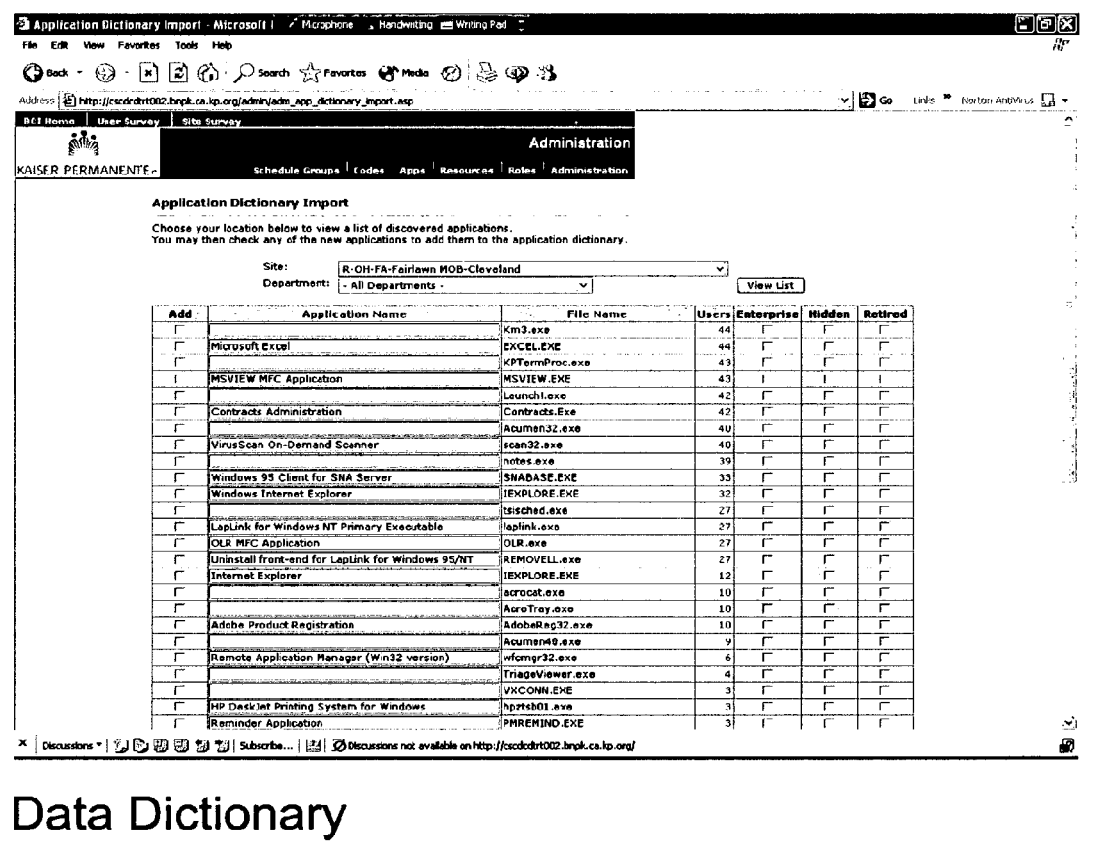

FIG. 9 illustrates the information contained in the data dictionary. The data dictionary contains information from the auto discovery results such as the software applications discovered and the applications available in the image.

Figure 10:
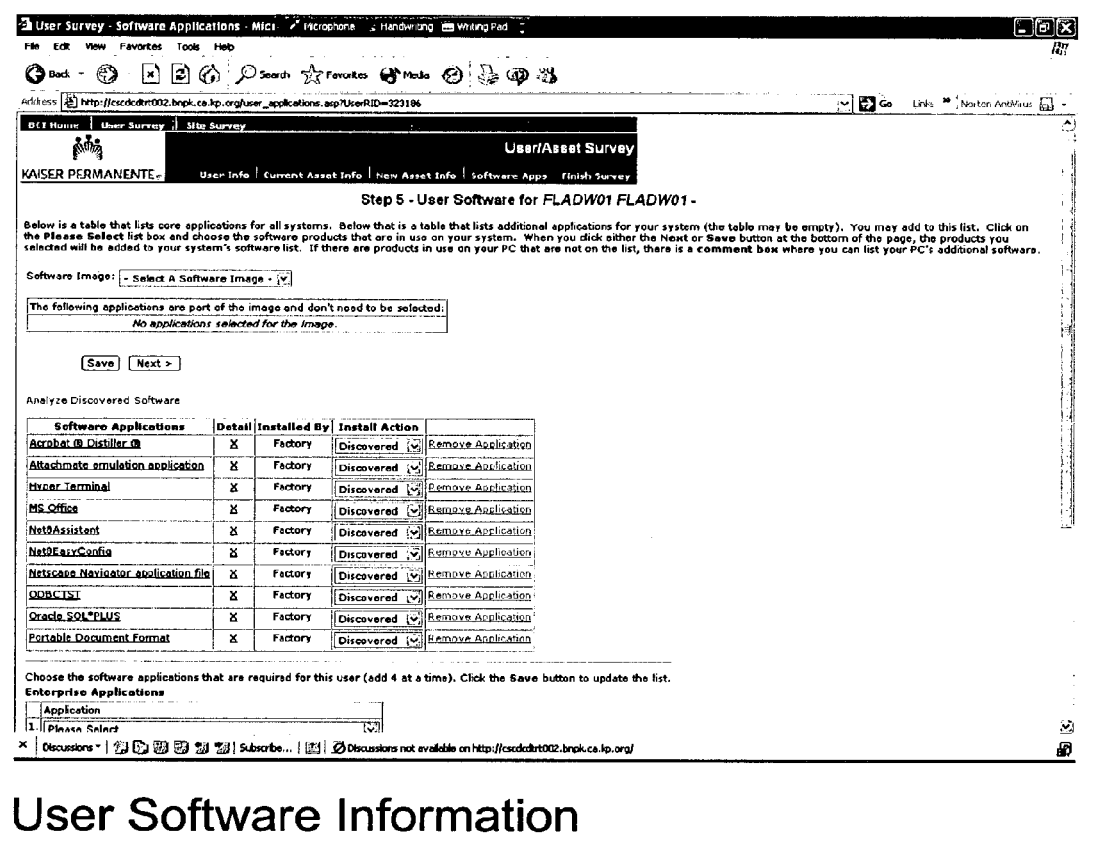

FIG. 10 illustrates a screen display showing user software information. User software information includes such information as the name of the software application, where the application was installed and the status of the application.

Figure 11:
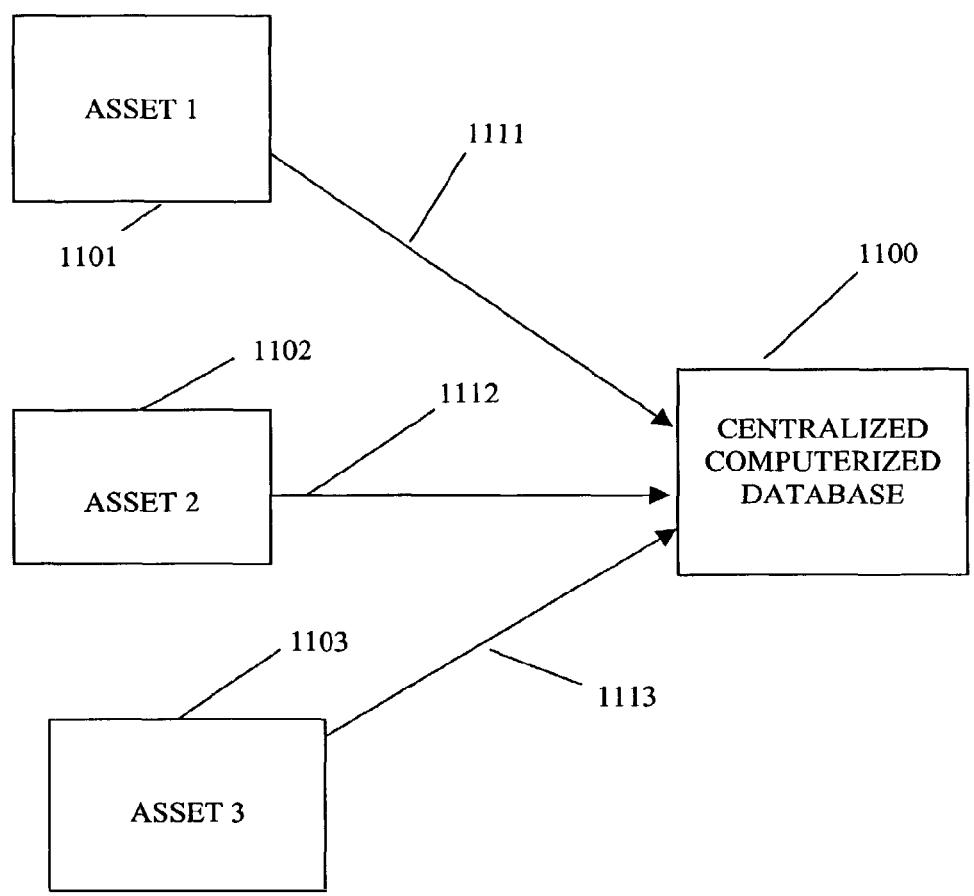
FIG. 11 is an illustration of one embodiment of an integrated asset management system.

FIG. 11 illustrates the preferred embodiment for a system for integrated asset management. In this system, assets 1101, 1102 and 1103 connected to a centralized, computerized data base 1100. The system provides a means, 1111, 1112 and 1113 for aggregating information from the assets, 1101, 1102 and 1103 into the centralized, computerized data base 1100.

Once information has been received from the assets 1101, 1102 and 1103, asset transition events can be scheduled information relating to those asset transition events can be stored in the centralized, computerized data base 1100. Thereafter, the assets 1101, 1102 and 1103 can be tracked on an on-going basis so that information regarding future activities effecting the assets are recorded in the centralized, computerized data base 1100. Accordingly, future asset transition events can be scheduled using information contained in the centralized, computerized data base 1100.

It should be noted that the centralized, computerized data base 1100 may reside in a remote location separate from the assets. Information may be stored in the centralized, computerized data base 1100 in a relational data base. Information may be transmitted from the assets 1101, 1102 and 1103 through the centralized, computerized data base 1100 through, for example, the Internet or a local area network. Moreover, it may be desirable to make such transmissions in a secure, encrypted manner.

The assets in the system may, for example, be desktop computers, laptop computers, hand-held computers, printers, scanners, networking devices or storage devices. Information transmitted between the assets 1101, 1102 and 1103 through the centralized, computerized data base may include such information as user information, legacy asset information, new asset information, software application information, financial information, site information, event history information, logistical information, ownership information and usage information.

The previously described asset transition events may include such events as asset installation, asset relocation, asset disposition and asset maintenance. When information is conveyed from the assets 1101, 1102 and 1103 to the centralized, computerized data base 1100 the information may be first converted to a formatted data file for ease of storage and transmission and transfer. In addition, certain information may be filtered prior to transmission in order to remove unwanted or redundant information.

Information has been incorporated into the centralized, computerized data base and the assets 1101, 1102 and 1103, are being monitored, it may be desirable to manage activities of the assets. Management activities may include project management, installation management, relocation management, lease management, exception management, scheduling management, work flow management and resource management. In addition, it may be desirable to generate reports from the information contained in the centralized, computerized data base 1100. These reports may include project reports, asset reports, lease reports, activity reports, exception reports and consumer satisfaction reports. It may also be desirable to use the foregoing system to monitor, update and control versions of software resident on the assets 1101, 1102 and 1103. The system can also accommodate the translation of information in the centralized, computerized data base 1100 to a standard language.

We claim:

1. A method for application management comprising:
   inputting results from an electronic discovery application into a data dictionary, wherein the results indicate one or more applications installed at a computing device;
   generating one or more user software pages based on the results;
   comparing the one or more applications indicated as being installed at the computing device to an application indicated in the data dictionary as being installed at an earlier time;
   determining a status indicator of at least one of the one or more applications, wherein the status indicator is in the data dictionary based on the results of the comparison; and
   remotely installing at the computer device software corresponding to the one or more application, based on the determined status indicator.

2. At least one tangible, computer-readable medium, having contents that when executed by at least one data processing device, performs a method, the method comprising:
   inputting results from an electronic discovery application into a data dictionary, wherein the results indicate one or more applications installed at a computing device;
   generating one or more user software pages based on the results;
   comparing the one or more applications indicated as being installed at the computing device to an application indicated in the data dictionary as being installed at an earlier time;
   determining a status indicator of at least one of the one or more applications, wherein the status indicator is in the data dictionary based on the results of the comparison; and
   remotely installing at the computer device software corresponding to the one or more application, based on the determined status indicator.

3. A system for integrated asset management comprising:
   a processing means;
   an input means operable with the processing means to input results from an electronic discovery application into a data dictionary, wherein the results indicate one or more applications installed at a computing device;

a generating means operable with the processing means to generate one or more user software pages based on the results;

a comparing means operable with the processing means to compare the one or more applications indicated as being installed at the computing device to an application indicated in the data dictionary as being installed at an earlier time;

a determining means operable with the processing means to determine a status indicator of at least one of the one or more applications, wherein the status indicator is in the data dictionary based on the results of the comparison;

an installation means operable with the processing means to remotely install at the computer device software corresponding to the one or more application, based on the determined status indicator; and an output means operable with the processing means to produce information, based at least on the verification means.

4. A computer-readable storage device comprising instructions that, when executed by a computer system, cause the computer system to:

determine one or more applications at a remote computer device during an automated electronic discovery process;

input into a data dictionary a reference to the one or more applications determined during the electronic discovery process;

generate one or more user software pages based on the one or more applications determined during the electronic discovery process;

compare the one or more user software pages to information in the data dictionary, wherein the information includes results from a previous electronic discovery process to determine one or more installed applications;

determine a status of the one or more software applications referenced in the data dictionary, based on the results of the comparison; and remotely install an application at the computing device when the application is referenced at the data dictionary and is not an application of the one or more applications determined during the automatic electronic discovery process.

5. The method of claim 1 wherein the results from the electronic discovery application include information selected from a group consisting of executable files names, manufacturer's names, and application versions.

6. The method of claim 1 wherein the data dictionary retains information other than the results from the electronic discovery application.

7. The method of claim 1 wherein the user software pages are generated based in part on information contained in the data dictionary.

8. The method of claim 1 wherein the method of analyzing the user software pages includes a means for comparing the user software pages to the data dictionary and generating an analysis of the results.

9. The method of claim 1 wherein the method of analyzing the user software pages includes a means for updating the status of the software applications indicated in the data dictionary based on the results and verifying that the remotely installed software is properly installed on the computing device.

10. The method of claim 2 wherein the results from the electronic discovery application includes information selected from a group consisting of executable files names, manufacturer's names, application versions and a relative path.

11. The method of claim 2 wherein the data dictionary retains information other than the results from the electronic discovery application.

12. The method of claim 2 wherein the user software pages are generated based in part on information contained in the data dictionary.

* * * * *

UNITED STATES PATENT AND TRADEMARK OFFICE
CERTIFICATE OF CORRECTION

Page 1 of 2

PATENT NO. : 8,631,014 B2
APPLICATION NO. : 13/609165
DATED : January 14, 2014
INVENTOR(S) : Thomas et al.

It is certified that error appears in the above-identified patent and that said Letters Patent is hereby corrected as shown below:

On the Title Page, in the Figure, delete "  " and insert -- --, therefor.

On Title Page 3, in item (56), under "OTHER PUBLICATIONS", in Column 2, Line 24, delete "R." and insert -- R., --, therefor.

In the Drawings:

In Fig. 1, Sheet 1 of 11, for Tag "103", in Line 3, delete "INFORMATIO" and insert -- INFORMATION --, therefor.

In Fig. 2, Sheet 2 of 11, delete "  " and insert -- --, therefor.

In the Specification:

In Column 2, Lines 55-56, after "dictionary;", delete "and".

In Column 2, Line 58, delete "process." and insert -- process; and --, therefor.

In Column 4, Line 64, delete "may bc," and insert -- may be, --, therefor.

Signed and Sealed this
Fifth Day of August, 2014

Michelle K. Lee
*Deputy Director of the United States Patent and Trademark Office*

CERTIFICATE OF CORRECTION (continued)
U.S. Pat. No. 8,631,014 B2

In the Claims:

In Column 8, Line 41, in Claim 1, delete "application," and insert -- applications, --, therefor.

In Column 8, Line 60, in Claim 2, delete "application," and insert -- applications, --, therefor.

In Column 9, Line 15, in Claim 3, delete "application," and insert -- applications, --, therefor.